United States Patent
Yu et al.

(10) Patent No.: US 7,120,286 B2
(45) Date of Patent: Oct. 10, 2006

(54) METHOD AND APPARATUS FOR THREE DIMENSIONAL EDGE TRACING WITH Z HEIGHT ADJUSTMENT

(75) Inventors: Dahai Yu, Redmond, WA (US); Richard M. Wasserman, Redmond, WA (US)

(73) Assignee: Mitutoyo Corporation, Kawasaki (JP)

( * ) Notice: Subject to any disclaimer, the term of this patent is extended or adjusted under 35 U.S.C. 154(b) by 564 days.

(21) Appl. No.: 09/990,238

(22) Filed: Nov. 21, 2001

(65) Prior Publication Data

US 2003/0095700 A1    May 22, 2003

(51) Int. Cl.
G06K 9/00 (2006.01)
(52) U.S. Cl. .................. 382/145; 382/255; 382/266; 250/559.36; 356/511; 356/609; 356/614; 702/155; 702/167
(58) Field of Classification Search ............... 382/100, 382/131, 239, 155, 194, 128, 181, 190, 192, 382/232, 145, 255, 266; 73/618, 599; 200/548, 200/234, 559.36, 559.29; 348/194, 452, 348/448, 571; 356/625, 511, 603, 614, 609; 378/901; 340/180; 702/155, 167; 250/559.36
See application file for complete search history.

(56) References Cited

U.S. PATENT DOCUMENTS

| 4,494,139 A | * | 1/1985 | Shima et al. ................. 348/87 |
| 4,657,393 A |  | 4/1987 | Stern |
| 4,688,184 A |  | 8/1987 | Taniguti et al. |
| 5,402,532 A | * | 3/1995 | Epstein et al. ............... 345/422 |
| 5,943,441 A |  | 8/1999 | Michael |
| 5,960,379 A |  | 9/1999 | Shimizu et al. |
| 6,205,243 B1 | * | 3/2001 | Migdal et al. ............... 382/154 |
| 6,816,609 B1 | * | 11/2004 | Shimizu et al. ............. 382/151 |

OTHER PUBLICATIONS

Description of Prior Art Quick Vision™ Series of Vision Inspection Machines and QVPAK™ Software.

* cited by examiner

Primary Examiner—Sheela Chawan
(74) Attorney, Agent, or Firm—Christensen O'Connor Johnson Kindness PLLC

(57) ABSTRACT

A method and apparatus for tracing an edge contour of an object in three dimensional space is provided. The method and apparatus is utilized in a computer vision system that is designed to obtain precise dimensional measurements of a scanned object. In order to save focusing time during an automatic tracing measurement, multiple images may be collected and saved for a number of Z heights for a particular position of the XY stage. These saved images can later be used to calculate a focal position for each edge point trial location in the selected XY area rather than requiring a physical Z stage movement. In addition, a Z height extrapolation based on the Z heights of previous edge points can significantly speed up the searching process, particularly for objects where the Z height change of a contour is gradual and predictable.

16 Claims, 11 Drawing Sheets

METHOD AND APPARATUS FOR THREE DIMENSIONAL EDGE TRACING WITH Z HEIGHT ADJUSTMENT

FIELD OF THE INVENTION

The invention relates generally to methods and apparatus for electronically scanning and measuring an object, and more particularly to a method and apparatus for automatically determining the edges of a three dimensional object.

BACKGROUND OF THE INVENTION

Computer vision systems can be utilized to obtain precise dimensional measurements of scanned objects. Such systems may include a computer and a camera and optical system with a stage that is movable to allow the camera to follow the edge contour of an object that is being scanned. One exemplary prior art system that is commercially available is the QUICK VISION™ series of vision inspection machines and QVPAK™ software available from Mitutoyo America Corporation (MAC), located in Aurora, Ill.. This product includes a two-dimensional autotrace edge detection tool that is designed to detect points along a continuous edge contour of an object, and automatically move the stage as necessary to follow the contour beyond the limits of any single video image. A single video image often encompasses only a portion of the object being scanned, given the desired magnification, measurement resolution and physical size limitations of such systems. The two-dimensional autotrace edge detection tool helps to save time when the vision system is operated in a "learning" mode, where it is being programmed to measure various characteristics of a relatively long edge contour, which might cross multiple video images. Since this tool has the ability to determine or modify its trace path based upon edge contour information of a particular sample at run time, it also helps to avoid the run-time failures that occur with edge tools which rely on a fixed position and a pre-programmed edge configuration.

The two-dimensional autotrace edge detection tool operates according to an autotrace algorithm, as will be described in more detail below with respect to FIGS. 1A, 1B, and 1C. At the beginning of the autotrace algorithm, a user defines a tool. This initial tool definition includes for example, tool position, tool scanning direction, and scan line sampling interval. The various edge detection thresholds and polarity of the scanning direction and the edge transitions of the edge to be traced are automatically learned according to known methods. The polarity of the edge transition indicates whether the expected edge exhibits an intensity increase—dark to light—along the defined scanning direction, or an intensity decrease—light to dark—along the defined scanning direction. Using some or all of the above-mentioned information, two edge points are detected, as illustrated in FIG. 1A, where two scan lines S1A and S2A locate two edge points A1 and A2 along the edge of a target object TG. The scan lines are initially located a default distance D12 apart. The distance between scan lines is more generally called the scan line sampling interval herein.

In accordance with the autotrace algorithm, once the edge points A1 and A2 are located, the next edge location to be tried is determined based on the locations of the edge points A1 and A2, using a linear extrapolation. As illustrated in FIG. 1A, an extrapolation line E1A is shown through the edge points A1 and A2. A third scan line S3A is arranged perpendicular to E1A and at the distance D12 along the linear extrapolation line E1A from edge point A2. The third scan line S3A locates a third edge point A3. The edge point A3 is then used to form a new linear extrapolation line E2A through edge points A2 and A3, which is used to search for a new edge point. As this process continues, if the linear extrapolation method fails to locate a new edge point, then an additional linear extrapolation procedure is tried, as is described in more detail below with reference to FIG. 1B.

FIG. 1B illustrates an additional linear extrapolation procedure that is invoked if the procedures illustrated by FIG. 1A fail to locate an edge point. With regard to FIG. 1B, two scan lines S1B and S2B are shown to locate two edge points B1 and B2. A linear extrapolation line E1B is shown through the edge points B1 and B2. A third scan line S3B is shown along the extrapolation line E1B. As shown, scan line S3B does not locate a new edge point.

After scan line S3B does not locate a new edge point, the previous two detected edge points B1 and B2 are still used to determine the next edge point trial location. The same extrapolation is applied, although the scan line sampling interval used to extrapolate is halved. Thus, by halving the scan line sampling interval, the location of a new scan line S4B is determined. Since scan line S4B does not locate an edge point, the process is again repeated in that the scan line sampling interval is again halved, as illustrated by the location of scan line S5B. As shown, scan line S5B locates an edge point B3. Since a new edge point has been found, the edge point B3 replaces the edge point B1 that was used to determine the current edge point trial location, and the search process is reset to the procedures of FIG. 1A. Thus, a new extrapolation line E2B is shown through the edge points B2 and B3.

The halving process illustrated by FIG. 1B is repeated until either a predetermined minimum scan line sampling interval is reached, or an edge point is found. If the minimum scan line sampling interval is reached and no edge point is found, a rotation search will be invoked, as is described in more detail below with reference to FIG. 1C.

FIG. 1C illustrates a rotation search. In FIG. 1C, three edge points C1, C2, and C3 are shown along the edge of the target object TG. An extrapolation line E1C is shown through the edge points C2 and C3. A scan line S1C is shown through the edge point C3. It is presumed that the methods described above with reference to FIGS. 1A and 1B have been tried and have failed to locate an edge point beyond the edge point C3.

According to the procedures of FIG. 1C, the previous two detected edge points C2 and C3 are used to extrapolate one edge point trial location in the reversed direction to the previous searching direction along the edge contour. Conceptually, it is as though the entire edge locating tool/procedure is pivoted in the plane of the image around the last edge point located. It should be noted that because the entire tool is "pivoted", the polarity of the tool edge scan will now be in the opposite direction relative to the part of the edge profile that has been already detected. Thus, a previously detected edge will not be detected again, due to the previously learned/defined polarity of the expected edge transition. Thus, a second scan line S2C is shown along the extrapolation line E1C in the reverse direction to the previous searching direction of the edge profile. It should be noted that in this the case shown in FIG. 1C the polarity of the tool scan is defined so that the search is for a change from object (dark) to background (light), and thus the scan line S2C does not locate an edge point since the transition in this case is from light to dark.

Since no edge point is detected by the scan line S2C, the tool scan's orientation will be rotated by a predetermined angular increment based on the radius of the rotation—(i.e. the scan line sample interval) and the length of the scan line such that it is impossible for an edge to fall between the end of one scan line and the start of the next incrementally rotated scan line. This process will be repeated until either an edge point is detected or the tool scan comes back to its original location. Thus, as illustrated in FIG. 1C, the tool scan's orientation is rotated by an angle increment of a predetermined amount, so as to produce a scan line S3C. This process is repeated for scan lines S4C, S5C, and S6C, the rotation of which are tangent to a circular rotation R1C. As shown, the scan line S6C locates a fourth edge point C4.

The edge point C4 then replaces the edge point C2, and the search process is reset to the procedures of FIG. 1A. Thus, a new extrapolation line E2C is shown through the edge points C3 and C4. If no new edge point had been found before the tool scan came back to its original location, the algorithm would report a failure.

The above procedures of FIGS. 1A, 1B, and 1C are effective for automatically tracing an edge of an image in a two dimensional image that is well-focused throughout. However, in practice it is desired to provide a similar type of autotrace tool to measure edges along a relatively long contour, which may extend through two or more image frames, according to the sizes of objects that are desired to be scanned, and/or for complex shaped parts. In such cases, there are often significant height changes along the contour, relative to the focal plane of the imaging system. Such height changes are also called depth changes herein, because they occur in a direction generally parallel to the direction of the depth of field of the imaging system. These height/depth changes can result in loss of focus and poor edge contrast. Poor edge contrast will cause the edge detection operations to fail or report an error—as it should for an image that cannot support reliable edge measurement. The inventors have also determined that simply augmenting the prior art two-dimensional edge tool with conventional auto-focus operations results in excessively slow edge tracing performance, particular for run mode applications. Thus, the inability of the existing tool to correct known problems via effective automated camera height adjustment is a limit on its usefulness. The present invention is directed toward improving on the above method by defining fast and effective systems and methods for determining the necessary changes in height and focus (e.g., along the Z axis) as the tool traces an edge contour in the three dimensional space, and by reusing as much data as possible so that time-consuming motions of the vision system are minimized.

SUMMARY OF THE INVENTION

A method and apparatus for tracing an edge contour of an object in three dimensional space is provided. As previously discussed, motion operations of a machine vision system are particularly time consuming. Such operations include auto-focus operations, open-loop focus operations, and stage movements. Therefore, an attempt is made to avoid each of these operations to the maximum extent possible in the various embodiments of the systems and methods according to this invention, and particularly for run mode applications. An attempt is also made to use open-loop focus operations in preference to auto-focus operations, and to base as many operations and motions as possible on previously acquired data, in order minimize both motion and image acquisition time. An attempt is also made to restrict the image processing operations to a small region surrounding the next edge point to be determined, in order to minimize image processing operation time.

In accordance with one aspect of the invention, in order to save focusing time during an automatic tracing measurement, multiple images may be collected at various height positions and saved for a particular position of the XY stage as necessary. These saved images can later be used to calculate edge points at the same focal position for each edge point trial location in the same XY area. This is advantageous, in that repetitive physical Z stage movement may be avoided in certain circumstances, and the reusing of the stored images can save a significant amount of machine moving and signal processing time. Thus, the overall throughput of the vision system is increased.

In accordance with another aspect of the invention, a Z height extrapolation can be obtained by using information related to previously located edge points. For a large number of applications, the Z height change of a contour is gradual and predictable. Based on this characteristic, the Z height extrapolation can be calculated using the Z heights of the two previous points, when an image stack for a particular position is not available. This method speeds up the searching process significantly and is very efficient for measurement applications with gradually changing edge contours.

In accordance with another aspect of the invention, a user initially defines an edge tracing and/or measuring tool in terms of tool position, tool scanning direction, and scan line sampling interval. The user may also define a Z search range. Alternatively, a value for the Z search range, the tool scanning direction and the scan line sampling interval may be automatically selected by the system or set to a default value associated with the tool. The Z search range may be chosen to be larger than the largest step in height/depth change expected between any two adjacent edge points. With the above information, an initial image stack in the predefined Z search range can be collected and stored for the starting position.

In accordance with another aspect of the invention, the Z position for each of the first two edge points is determined from source images selected from an image stack so that the images exhibit the maximum contrast values at those edge points, in comparison to other images in the stack. There is an option to either physically move the stage to the Z position that gives the maximum contrast and obtain a new image for the upcoming edge detection, or else simply choose the image from the image stack that is the closest to the calculated Z position. The first option provides better image results, good XY measurement accuracy and good Z-measurement accuracy, while the second option retains good XY measurement accuracy, and saves measurement time by not acquiring a new source image at a new Z-position or refining the Z measurement accuracy. The decision regarding which option is used can be made based upon accuracy and speed requirements.

In accordance with another aspect of the invention, before a search on an edge point trial location is conducted, the location is checked to make sure it is within the current video window. If the location is not within the current video window, the stage may be moved to a calculated position.

In accordance with another aspect of the invention, a two-dimensional autotrace method is initially used to extrapolate the next edge point trial location, which is also referred to as a next edge point XY trial location herein. The image stack is used to find the image or Z position exhibiting the maximum contrast peak for the next edge point XY trial location. It should be noted that there is no physical movement or additional image acquisition required for the maximum contrast peak search that is done using the stored images from the image stack. If this procedure succeeds, the new edge point is determined and stored and the searching process continues. If an edge point is not located, an estimate for the Z height for the edge point trial location can be determined by extrapolating using the Z heights of the previous two edge points. If an edge point is still not located, a new image stack is taken using the Z height of the last detected edge point as the center, and the search process begins again with the initial portion of the autotrace method. If a new edge point is still not located, a halving routine is invoked.

In accordance with another aspect of the invention, any previously determined stack of images may be reused whenever the X, Y and Z positions for an edge point to be located are reasonably expected to be lie within the images included in the stack. This may commonly occur for example when an edge contour to be traced is small relative to the video window, when a contour exhibits relatively little depth, when the scan line sampling interval is small relative to the video window, and when tracing near the end point of a closed contour approaches the beginning point already determined for the closed contour.

In accordance with another aspect of the invention, a halving routine includes a procedure in which the scan line sampling interval for extrapolation is halved. The searching process is then redirected to the initial portion of the autotrace method. If a new edge point is located, the new edge point is stored and the searching process continues. If a new edge point is not located, the scan line sampling interval is again halved, and this process is repeated until either a new edge point is located or else the scan line sampling interval reaches a predetermined criterion. Once the predetermined criterion is reached, a rotation search is invoked.

In accordance with another aspect of the invention, in a rotation search, if there is not an image stack taken at the last detected edge point, the algorithm first acquires a new image stack taking the Z height of the last detected edge point as the Z scanning center. Then, the searching process is repeated on multiple edge point trial locations and directions, which are tangential to the circumference of a circle centered on the last detected edge point. The radius of the circle is equal to the scan line sampling interval. During this process, in one embodiment, the Z extrapolation using previous Z heights is not applied in an effort to minimize the number of mistakes that may occur from picking up incorrect edge points.

It will be appreciated that the disclosed method for tracing a three-dimensional edge contour is advantageous in that it can accurately trace the edge of an object even if the edge of the object has significant height/depth changes. Such height changes occur frequently in practice even for otherwise flat objects, due to the objects being large, magnified, and being improperly aligned to the XY plane, or else having irregularities in the Z-direction. Furthermore, the disclosed method advantageously uses a stack of stored images and/or extrapolated Z positions as the basis for source images for performing edge detecting operations, rather than attempting to use time-consuming autofocus operations. Thus, the systems and methods of this invention save a significant amount of motion and processing time in comparison to alternative methods. In addition, when the most precise Z measurement of edge points is not an objective of the method, for example when the coordinates of relatively flat part are to be measured, but the part nevertheless extends more than one depth of field in the Z axis direction, estimating the maximum contrast Z position of an edge point based on existing images significantly speeds up the process of edge detection and edge point position determination.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 2A:
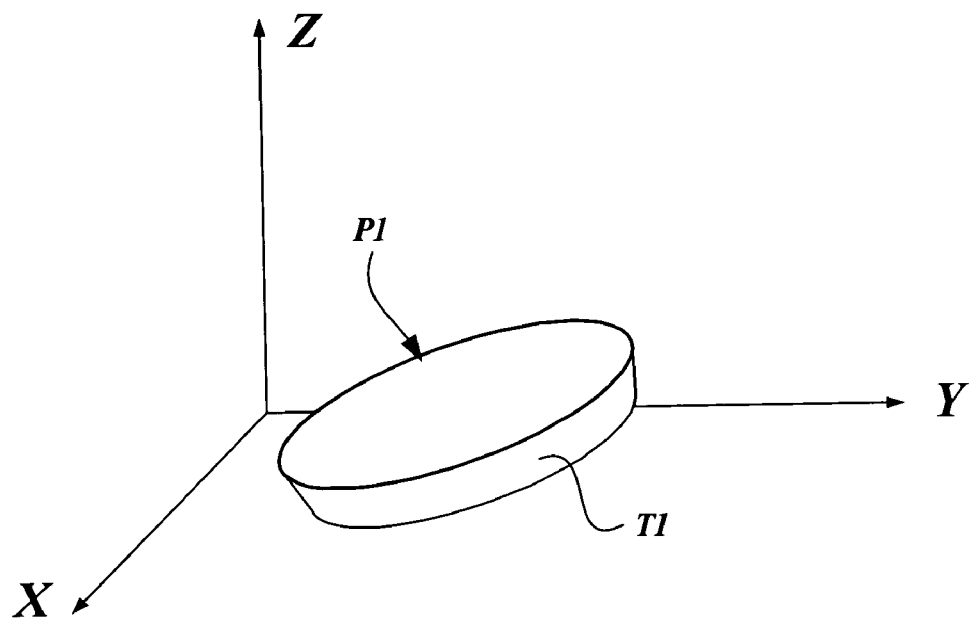
FIGS. 2A–2C illustrate objects with three-dimensional edge contours.
Figure 2B:
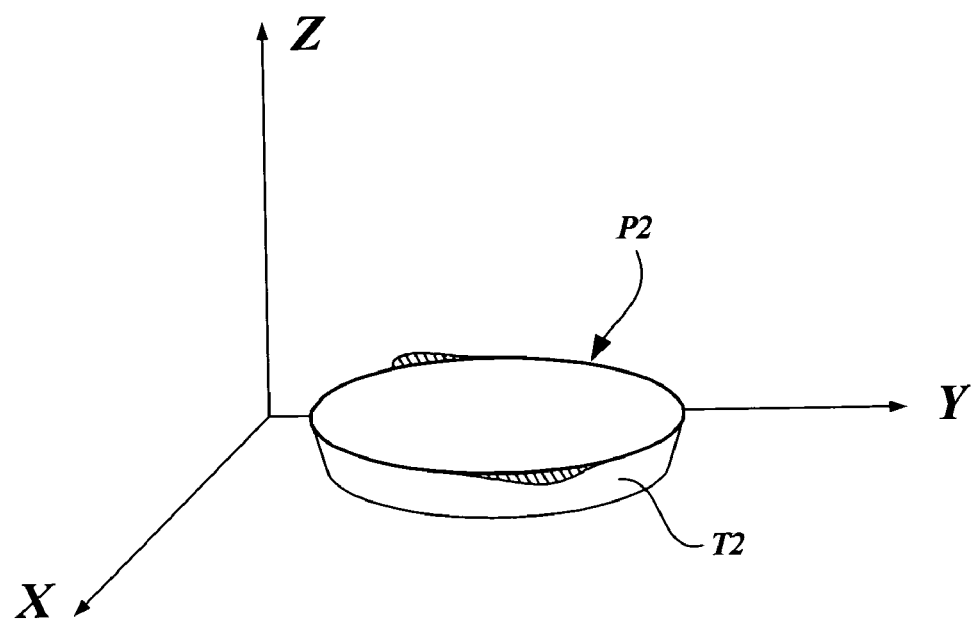
Figure 2C:
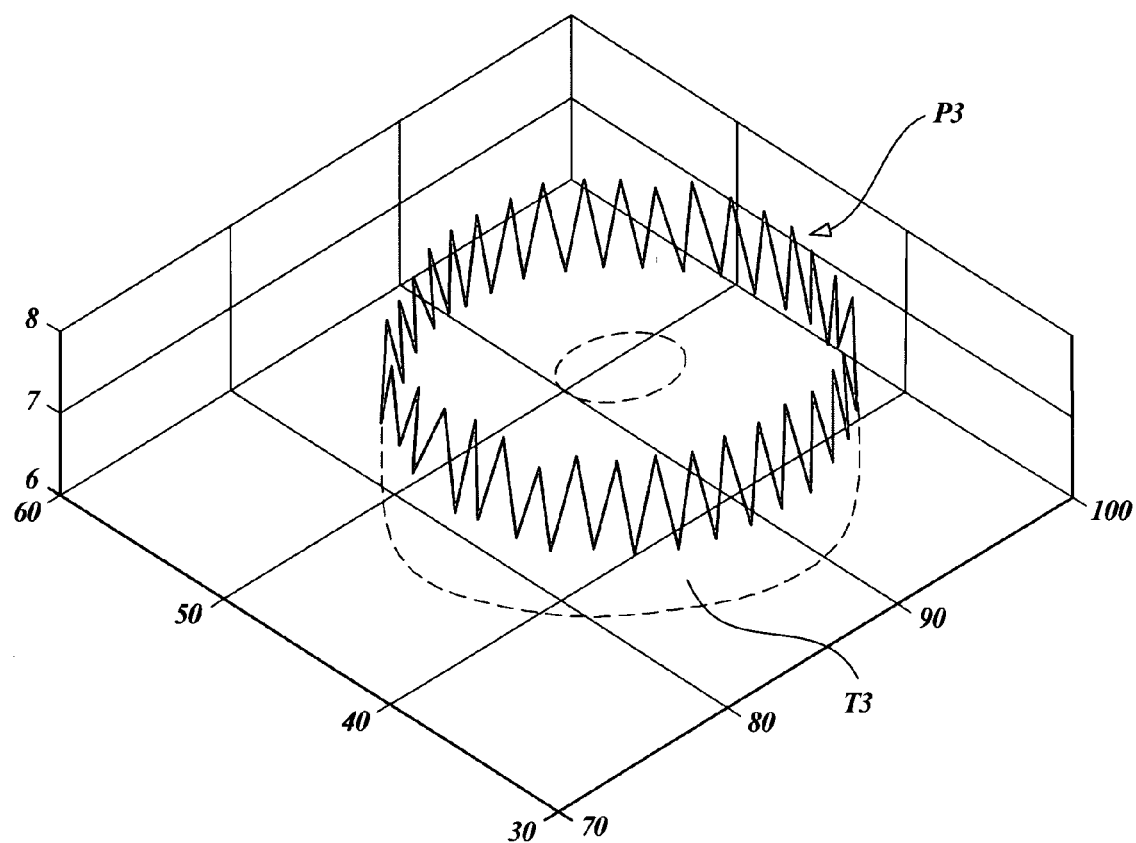

FIGS. 2A, 2B, and 2C illustrate objects that have edge contours with Z height changes. The present invention is advantageous for processing such edge contours. FIG. 2A illustrates an object T1 with an edge contour P1 contained in a single plane of the object T1, but not well aligned to the XY plane of the vision system. In this example, the XY plane is the stage plane of the measurement machine. This illustrates a common occurrence when measuring a relatively large object. When this type of alignment error occurs, if the edge contour extends beyond the initial depth of the focus of the machine, an autotrace tool must provide a means for acquiring and using supplementary images to determine the location of the edge contour extending beyond the initial depth of the focus of the machine.

FIG. 2B illustrates an edge contour P2 of an object T2 with irregularities in the Z-direction. These types of irregularities can also be relatively large and extend beyond the initial depth of the focus of the machine. Thus, an autotrace tool must provide a means for acquiring and using supplementary images to determine the location of the edge contour extending beyond the initial depth of the focus of the machine. FIG. 2C illustrates the outer edge contour P3 of an object T3 which is a bevel gear shown in dashed outline (the body of the gear is not shown in detail). This type of object is designed to have an edge contour that is inherently not within a single plane. For such an object, the edge contour will typically go beyond the depth of focus of the vision system machine. The outer edge contour P3 was determined according to an exemplary embodiment of the systems and methods according to this invention. As will be described in more detail below, the present invention is directed to a method that accurately traces three-dimensional edge contours such as those shown in FIGS. 2A, 2B and 2C.

Figure 3:
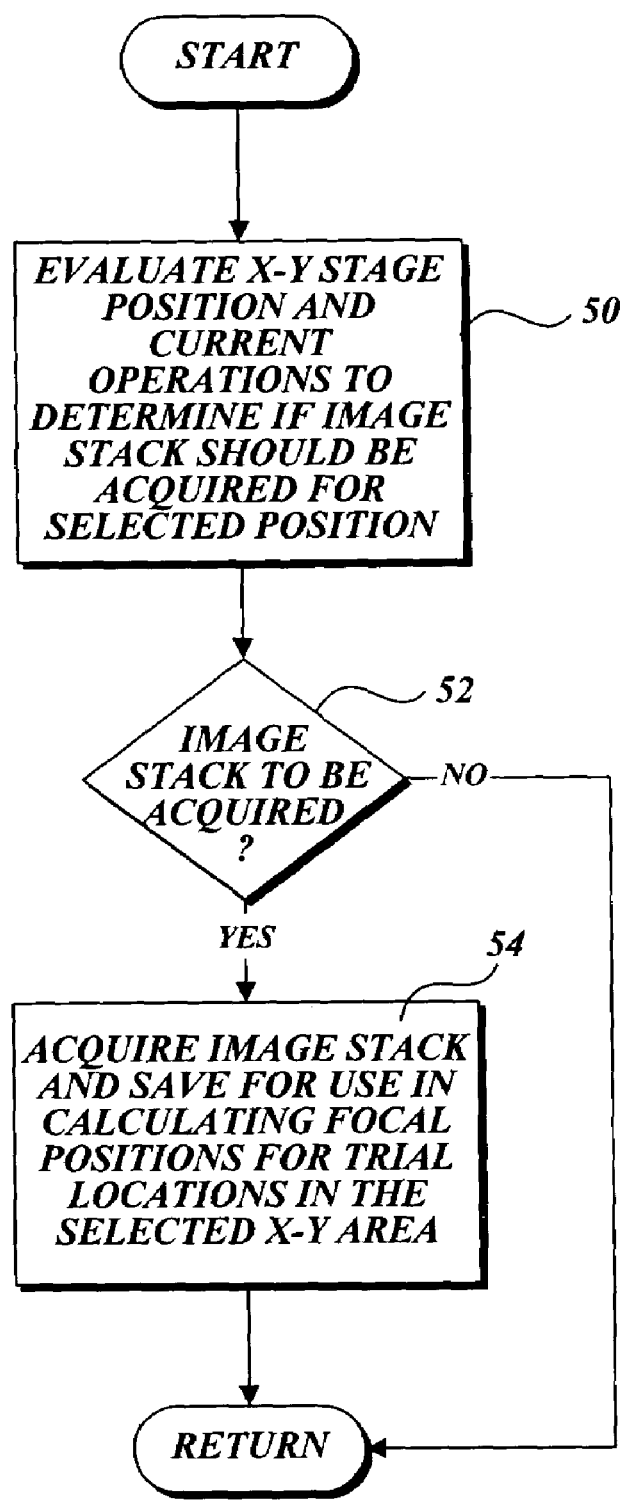
FIG. 3 is a flow diagram illustrating a general method for determining whether an image stack should be acquired.

FIG. 3 is a flow diagram illustrating a general method for determining when an image stack should be acquired. In accordance with the present invention, in order to save focusing time during automatic tracing and measurement operations, multiple images sometimes are collected at various height positions and saved for particular positions of the XY stage as necessary. These saved images can later be used to calculate focal positions for each edge point trial location in the same XY area. In other words, the physical Z stage movement will not be required, and by reusing the stored images a significant amount of time can be saved.

As shown in FIG. 3, at a block 50, the routine evaluates the XY stage position and the currently defined measurement operations to determine if an image stack should be acquired for the selected position. For example, if the current operation is an initial operation of a set of automatic tracing and measure operations, then an image stack is acquired at a starting XY location. If an image stack already exists for the present XY location, and it fails to support edge detection at the required location, then Z-extrapolation is tried next, without acquiring a new image stack. Finally, if an image acquired based on an extrapolated Z position failed to support edge detection at the required location, then a new image stack is acquired with its central Z position set at the Z position of the last detected edge point—if such an image stack does not already exist. At a decision block 52, the routine determines if an image stack should be acquired. If an image stack is not to be acquired, then the routine continues to its end, where it returns. If an image stack is to be acquired, then the routine proceeds to a block 54. At block 54, the routine acquires the image stack and saves it for use in calculating focal positions for edge point trial locations in the selected XY area. The routine then ends and returns.

Figure 4:
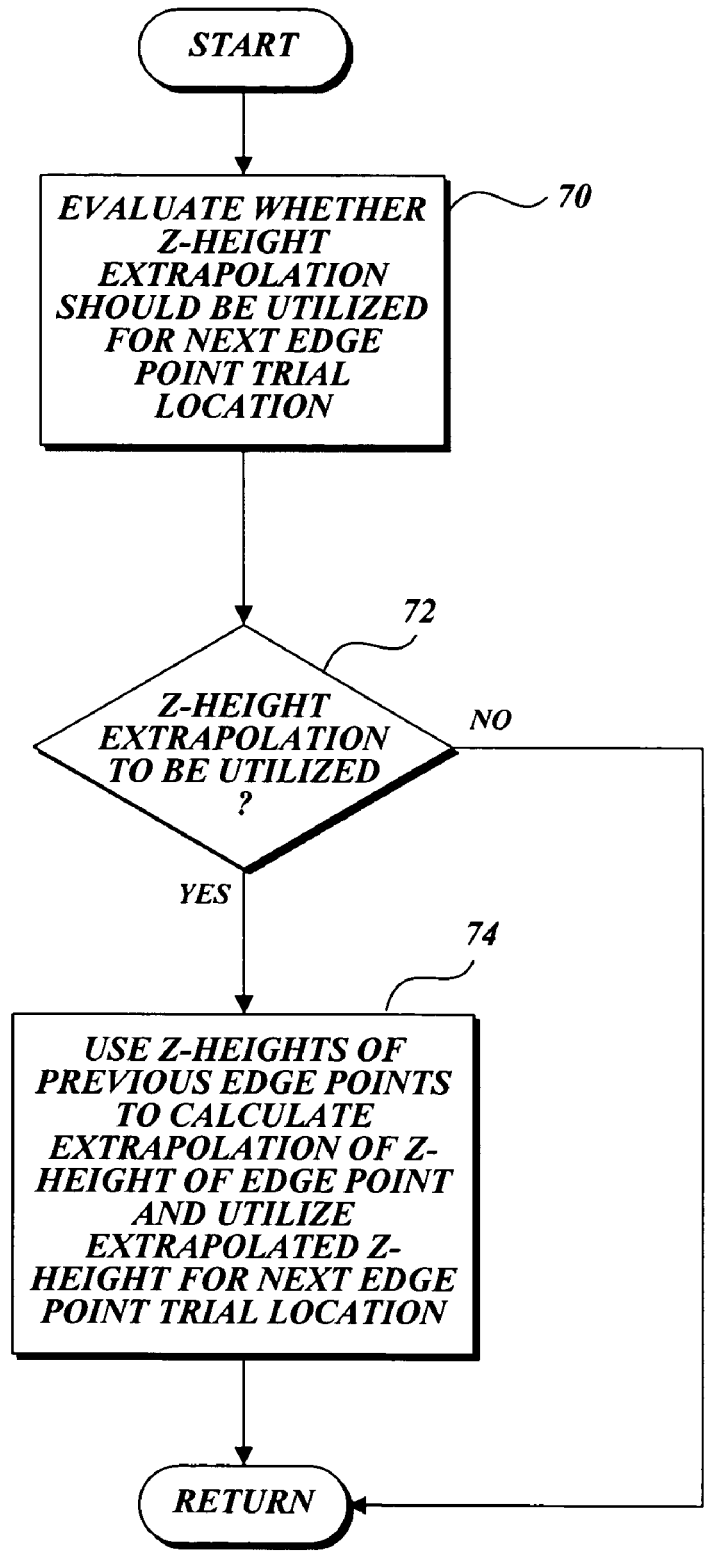
FIG. 4 is a flow diagram illustrating a general method for determining whether a Z height extrapolation should be utilized.

FIG. 4 is a flow diagram illustrating a general method for determining when a Z height extrapolation should be utilized. In general, for a large number of applications, the Z height change of a contour is gradual and predictable. This means that a good Z height extrapolation can be obtained by using information from previously obtained edge points. Based on this analysis, the Z height extrapolation can be calculated using the Z heights of two or more previous edge points, when an image stack is not available for the next edge point XY trial location. This method speeds up the searching process significantly and is very efficient in measurement applications with gradually changing edge contours.

As illustrated in FIG. 4, at a block 70, the routine evaluates whether a Z height extrapolation should be utilized for the next edge point XY trial location, such as for setting a new Z height for image acquisition. For example, if the current operation is an initial operation of a set of automatic tracing and measure operations, then there is no basis for Z height extrapolation, and it is not used. If an image stack already exists for the next edge point XY trial location, then it is used. However, if an image stack has already failed to support edge detection at the next edge point XY trial location, or if the previous edge points were determined based on extrapolated Z heights, then Z height extrapolation is performed, as a basis for acquiring a new source image for the next edge point XY trial location. At a decision block 72, the routine determines whether the Z height extrapolation should be utilized. If the Z height extrapolation is not to be utilized, then the routine ends and returns. If a Z height extrapolation is to be utilized, then the routine continues to a block 74. At block 74, the routine utilizes the Z heights of previous edge points to calculate an extrapolation of the Z height of the edge point being searched for. The routine then ends and returns.

FIGS. 5–10 illustrate a detailed method for tracing a three-dimensional edge contour in accordance with the present invention. In summary, at a starting point a user or a part program defines an edge tool in terms of tool position, and a tool scanning direction, and scan line sampling interval if these are not automatically determined. A Z search range is defined either by the user or by a default value. A Z stack is acquired at the current stage position and utilized in the search for the first two edge points. In all further searches on any edge point trial location, it is determined whether the search location is within the current video window, otherwise the stage is moved as necessary according to a calculated position based on the next edge point XY trial location.

Figure 1A:
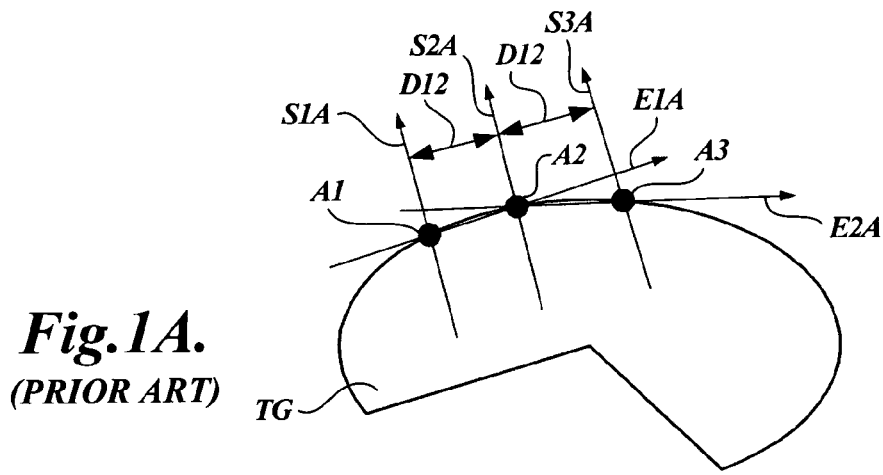
FIGS. 1A–1C illustrate a prior art method for tracing an edge contour in two dimensional space.
Figure 1B:
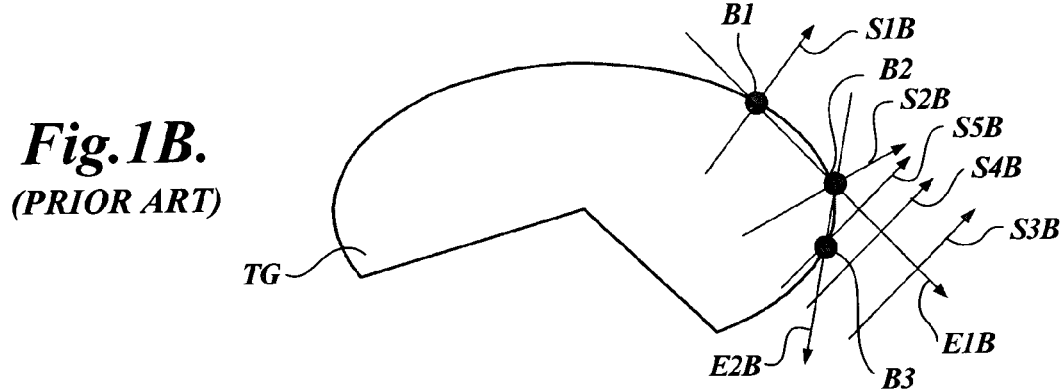
Figure 1C:
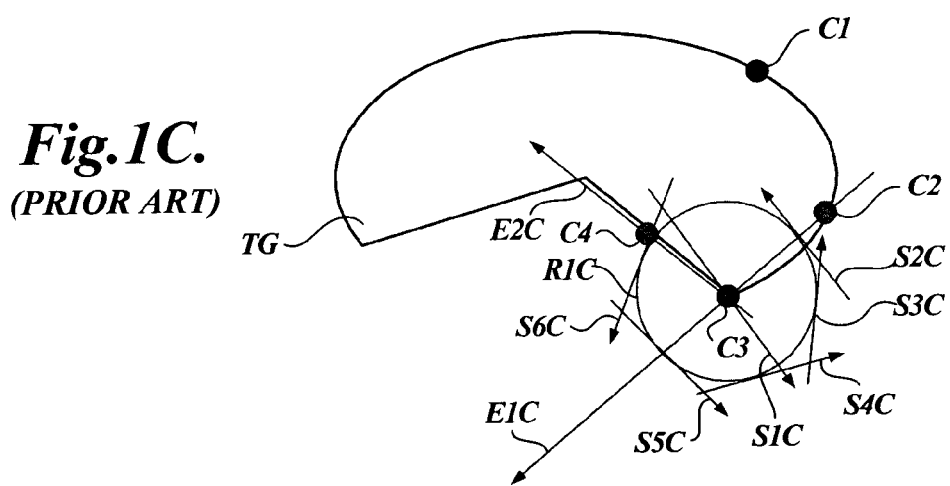

In the search for new edge points, two dimensional operations are performed analogous to the operations previously described with reference to FIGS. 1A–1C, to determine the XY coordinates of the next edge point XY trial location based on the image used for the last determined edge point location. Then the present image stack is used to find the source image offering the best focus for the expected edge point, that is, the image offering the maximum contrast peak in the vicinity of the edge point trial location. The term source image is generally used herein to refer to image acquired by the vision system which is used or usable for performing edge tracing and measurement operations. Then, if a new edge point is successfully found in that source image, it is stored and the searching process continues. If a maximum contrast peak is not found, or a new edge point is not found, the Z height for the edge point trial location is estimated by extrapolating it using the Z heights of two previous edge points. If a new edge point is still not found, a new image stack is obtained by taking the Z height of the last detected edge point as the center of the new image stack.

If a new edge point is still not found, a halving routine is invoked, in which the scan line sampling interval for the extrapolation is halved repeatedly until either a new edge point is found or the scan line sampling interval reaches a predetermined criteria. If a new edge point is still not found, a rotation search is invoked. In the rotation search, the searching process is repeated on multiple edge point trial locations and directions, which are tangential to the circumference of a circle centered on the last detected edge point. The above-described routines and procedures effectively locate edge points along a three-dimensional edge contour in a fast and effective manner.

Figure 5:
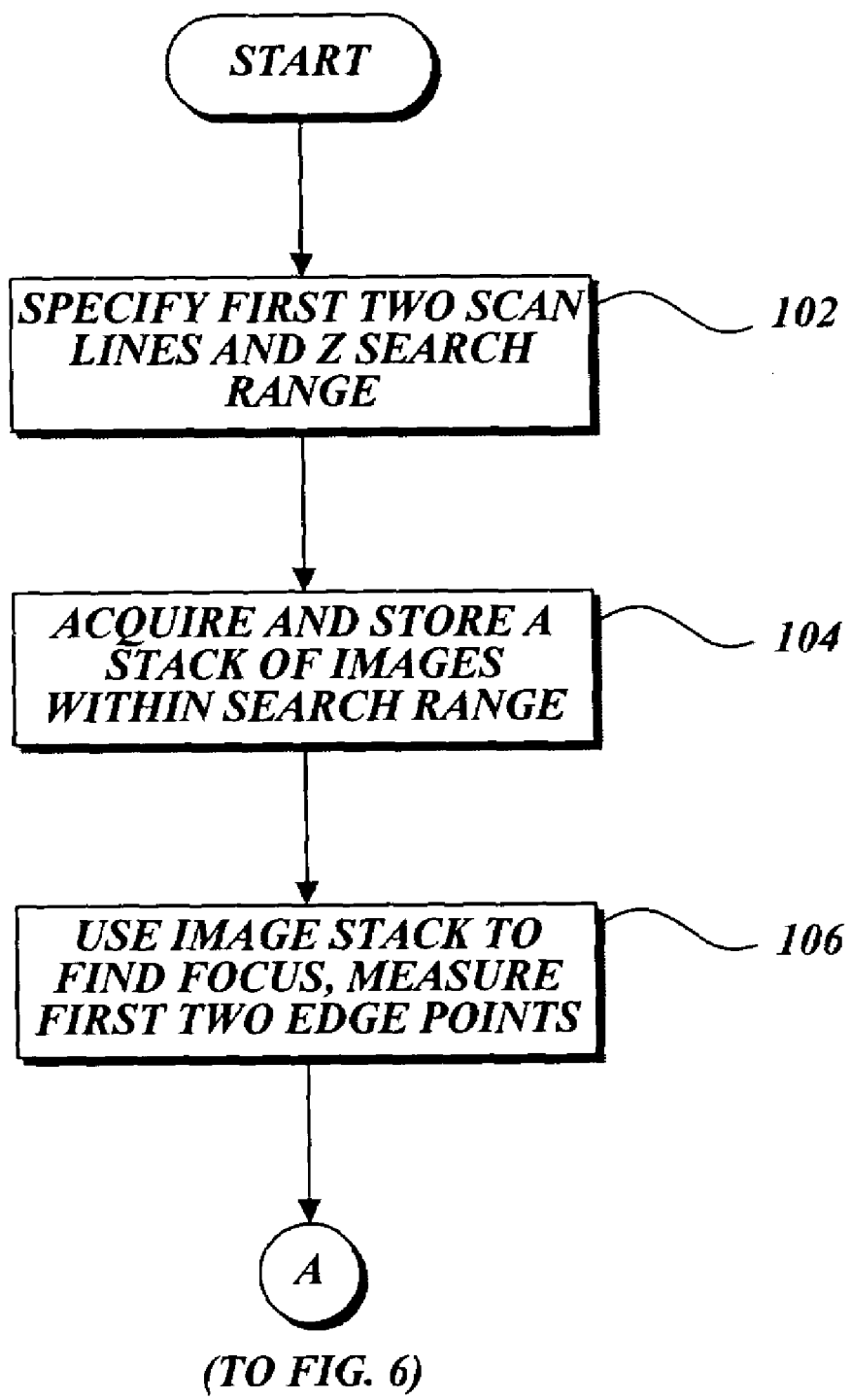
FIG. 5 is a flow diagram illustrating the beginning of a detailed autotrace method for tracing an edge contour in three dimensional space and which shows a routine for finding two edge points.

FIG. 5 is a flow diagram illustrating the beginning of the detailed autotrace method for tracing an edge contour in three dimensional space and which includes a routine for finding the first two edge points. Initially, a user defines an edge tool, including tool position and, if necessary, a tool scanning direction and a scan line sampling interval. A Z search range is either defined by the user or by a default value. In one exemplary embodiment, the user focuses the vision system on an edge point in the vicinity of the edge tool position and the default value for a predefined Z search range is set to +/−5 depth-of-field units corresponding to the current magnification of the vision system. As illustrated in FIG. 5, at a block 102, the first two scan lines are specified along with the Z search range. The thresholds and polarity of the edge to be traced are learned automatically. With this information, a series of images in the predefined Z search range (i.e., an image stack) are collected and stored for the starting XY position. In one exemplary embodiment, the Z spacing between images in the stack is set at a default Z spacing equal to the depth of field at the current magnification. Thus, at a block 104, a stack of images within the search range is acquired and stored. The routine then proceeds to a block 106.

At block 106, the stack of images is then used to find the Z position for each of the first two edge points. The maximum contrast values within the image stack are used to determine the Z positions of the first two edge points. In one exemplary embodiment, each image in the stack of images is evaluated along a current scan line, to determine a peak-gradient for each image in the stack of images. That is, in this exemplary embodiment, the peak-gradient for each image in the stack is the contrast value for that image in the stack. The current scan line is, for example, the scan line defined for use in determining the next edge point. It should be appreciated that determining the peak-gradient along a scan line is an initial or early operation performed in many edge point locating algorithms, and is therefore conveniently determined in various exemplary embodiments. The image with the maximum contrast value for each of the first two edge point trial locations is selected as the source image to be used for the Z positions of the first two edge points and for determining each of the first two edge points XY edge positions.

In one embodiment, the XY edge position in the selected source image is determined according to known peak-gradient type edge detection operations and other supplementary operations along a scan line and the thresholds and polarity of the edge to be traced are then learned automatically. However, it should be appreciated that any other known or later developed edge point locating algorithm is usable in various embodiments of the systems and methods according to this invention.

Figure 6:
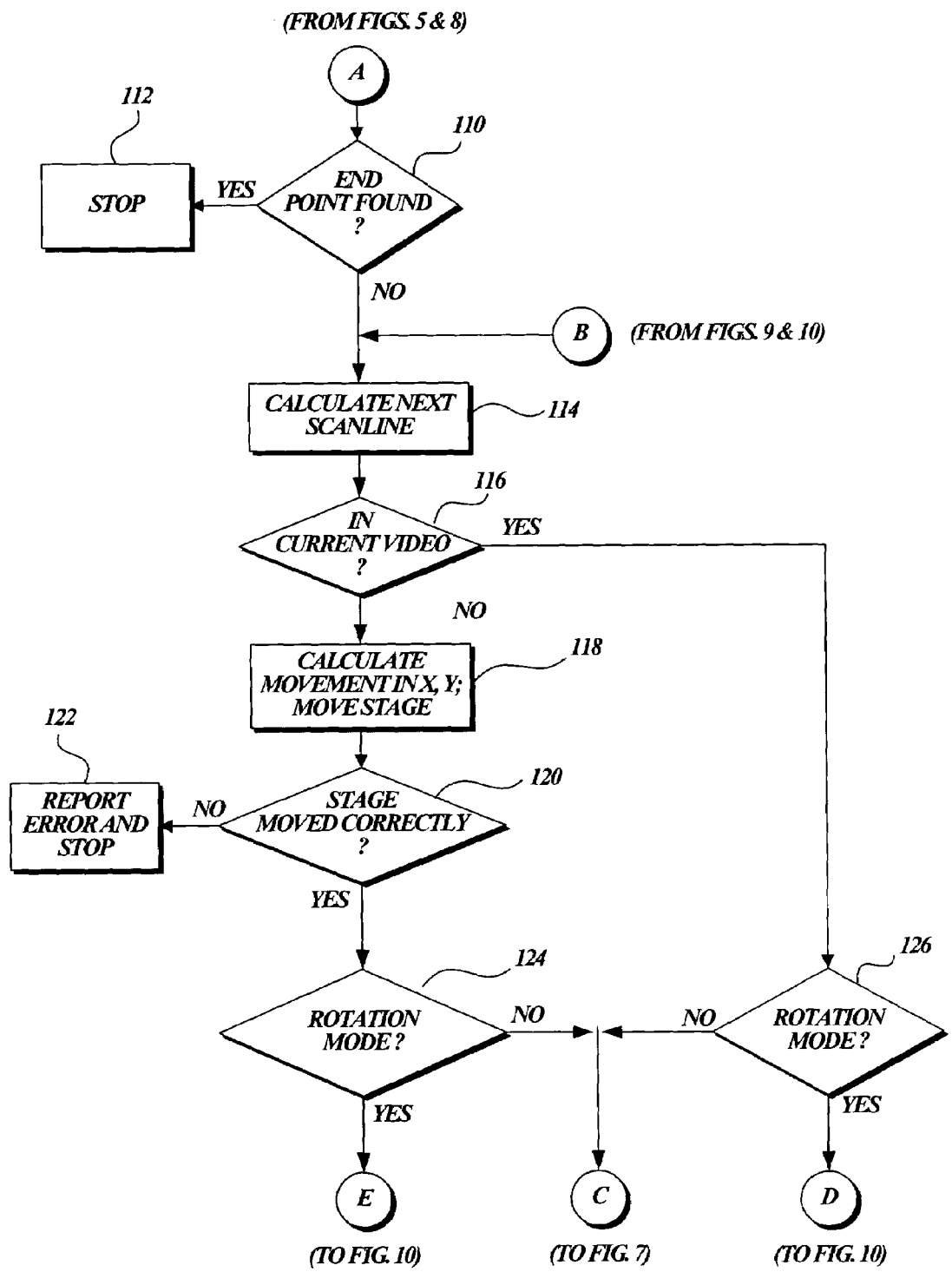
FIG. 6 is a flow diagram which is a part of the detailed autotrace method and which shows a routine for checking a location to make certain it is within a current video window.

Thus, at block 106, the image stack is used to measure the first two edge points in the one or more source images exhibiting the best focused edge points, as indicated by their maximum contrast values, after which the routine proceeds to a point A, which is continued in FIG. 6. It should be noted that there is an option to either physically move the stage to the Z position that gives the maximum contrast value and obtain a new source image for the upcoming edge detection, or else to simply choose the source image from the image stack that is closest to the calculated Z position. The first option provides better accuracy, while the second option saves measurement time. The decision regarding this option can be made based upon accuracy or speed requirements. Thus, in the exemplary embodiment described above, the source image that exhibits the largest value of the peak-gradient along the scan line use is selected as the image that gives the maximum contrast value. The Z positions of the first two edge point are determined corresponding to the selected source image(s) and then the routine proceeds to perform the XY edge detection operations along the scan line on the source image(s). This exemplary embodiment emphasizes speed.

In a second exemplary embodiment, conceptually, the various peak-gradients just discussed are plotted against the Z position values of their corresponding images in the stack of images. This produces a plot of peak-gradient values or, more generally, contrast values as a function of Z position. A curve, such as a quadratic curve, is then fit to these plotted values. This curve, and any analogous curve, is hereafter referred to as a peak contrast curve for the next edge point trial location. The peak of this peak contrast curve corresponds to a Z position which will produce a best focused image for the XY position corresponding to the approximate peak-gradient position along the scan line. The Z positions of the first two edge points are determined corresponding to the selected source image(s) and then the routine proceeds to perform the XY edge detection operations along the scan line(s) on the source image(s). This exemplary embodiment emphasizes accuracy, while maintaining relatively high speed.

FIG. 6 is a flow diagram which includes a routine for checking a location to make certain it is within a current video window. In the autotrace edge detection routine, before a search is conducted on any edge point trial location, it is necessary to check the location to make sure it is within the current video window. If it is not within the current video window, the routine has the function to move the stage to a calculated position.

Figure 8:
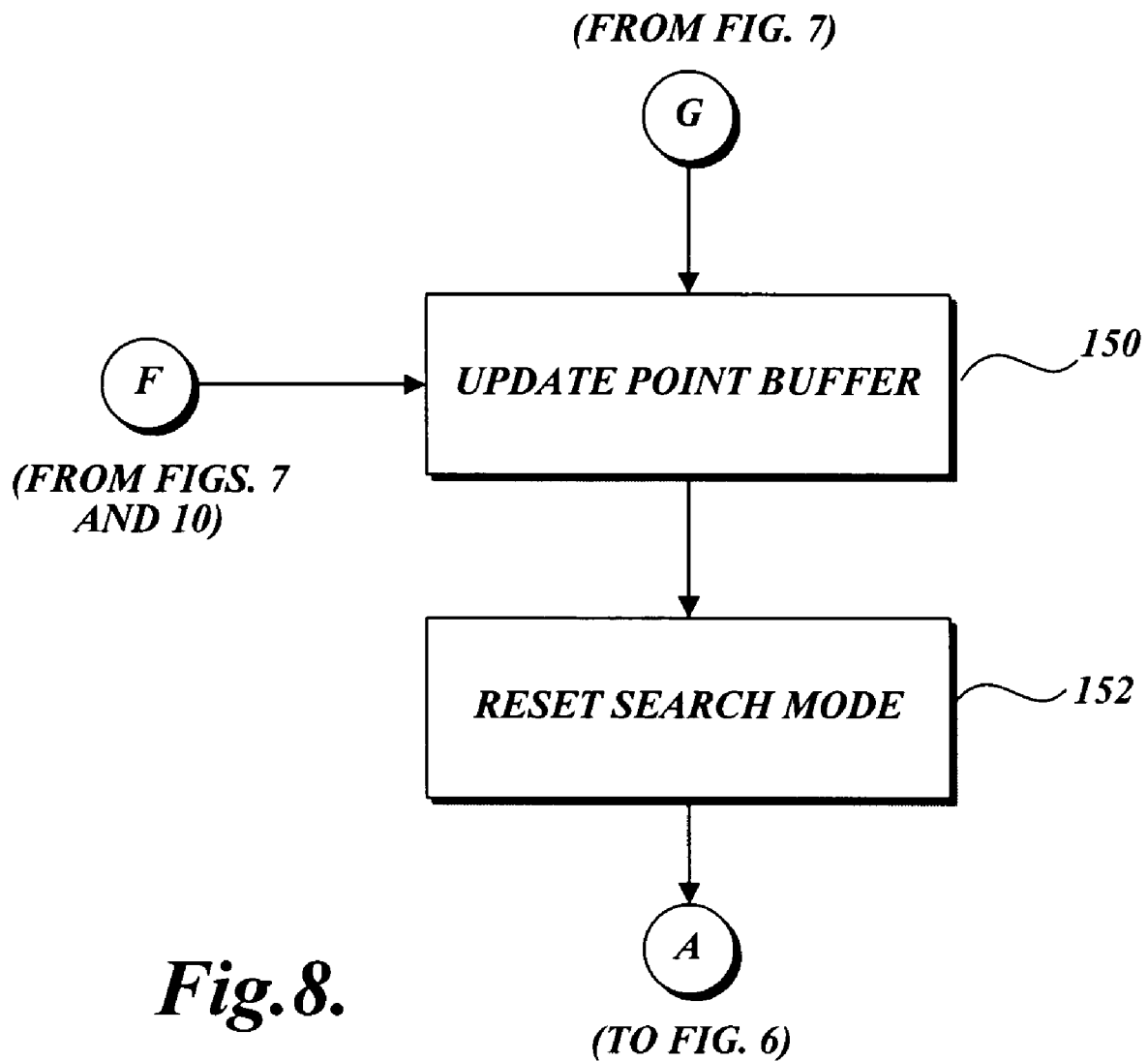
FIG. 8 is a flow diagram which is a part of the detailed autotrace method and which shows a routine for updating an edge point buffer and resetting a search mode.

As shown in FIG. 6, the routine is continued from point A, which may come from FIGS. 5 or 8. At a decision block 110, the routine determines whether the end point has been found. The end point is defined in the routine as the edge point at which the routine will stop once it is reached. Thus, if at decision block 110 the routine determines that the end point is found, then the routine stops. If the end point is not found, then the routine continues to a block 114. Block 114 may also be reached from a point B from FIGS. 9 or 10.

At block 114, the routine calculates the next scan line. At a decision block 116, the routine determines whether the next scan line is in the current video window. As previously discussed, in one exemplary embodiment, the next scan line is arranged perpendicular to an extrapolation line analogous to the extrapolated line E1A shown in FIG. 1A, and at a distance along the extrapolation line which is equivalent to a current scan line sample spacing or sampling interval. In one exemplary embodiment, a default or predetermined initial scan line sampling interval is set at a value equal to 20 times the pixel pitch in the current image. If the next scan line is in the current video window, then the routine proceeds to a decision block 126. At decision block 126, the routine determines whether it is in rotation mode. If the routine is in rotation mode, then the routine continues to a point D, which is continued in FIG. 10. If the routine is not in rotation mode, then the routine proceeds to a point C, which is continued in FIG. 7.

Returning to decision block 116, if the current scan line is not within the current video window, then the routine proceeds to a block 118. At block 118, the routine calculates movement in the X and Y coordinates, and then moves the stage. In one exemplary embodiment, the stage is moved such that a hypothetical line connecting the last two determined edge points in the coordinate frame of the new video window extends approximately through the center of the new video window, and the ends of the next anticipated scan line—corresponding to the next edge point trial location—are each located approximately 5 to 10 pixels distance, but at least 5 pixels distance from the edge of the anticipated video window. That, is, if the edge continues along the current linearly extrapolated trajectory, it will start from a safe margin near one edge of the video window and run toward the center of the next video image. Such stage positioning tends to minimize the need for future XY stage movement, which also decreases the edge tracing and measurement operation time in various embodiments of the systems and methods according to this invention. At a decision block 120, the routine determines whether the stage was moved correctly. If the stage was not moved correctly, then the routine proceeds to a block 122, where an error is reported and the routine stops. If the stage was moved correctly, then the routine proceeds to a decision block 124.

At decision block 124, the routine determines whether it is in rotation mode. If the routine is in rotation mode, then the routine continues to a point E, which is continued in FIG. 10. If the routine is not in a rotation mode, then the routine proceeds to a point C, which is continued in FIG. 7.

Figure 7:
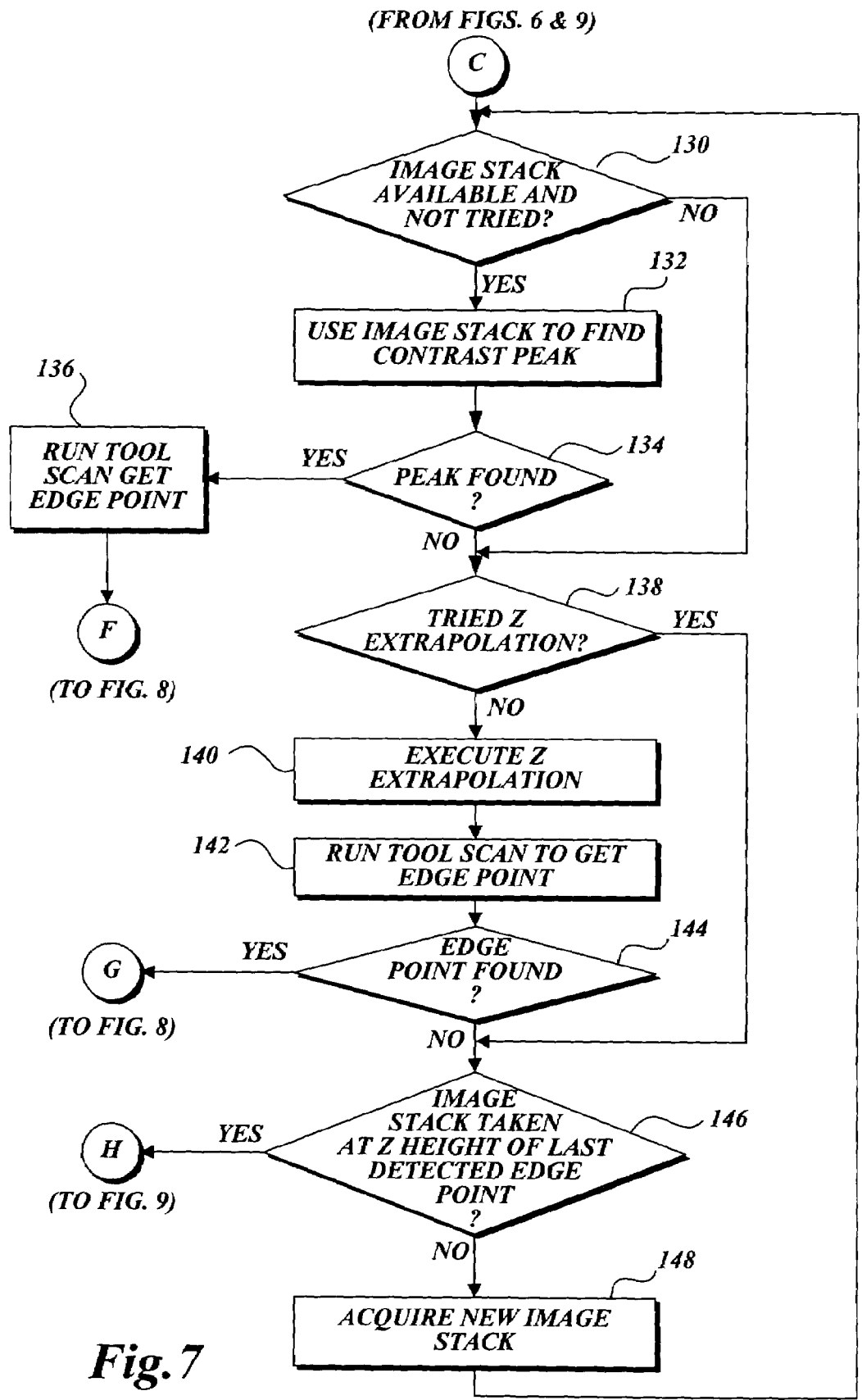
FIG. 7 is a flow diagram which is a part of the detailed autotrace method and which shows a routine for extrapolating edge point trial locations and locating edge points.

FIG. 7 is a flow diagram which includes routines for extrapolating edge point trial locations and locating edge points. In summary, the routines of FIG. 7 begin by using the stack of images to find the contrast peak, such as the previously described maximum peak-gradient, for a next edge point XY trial location. If a contrast peak is located, the corresponding source image is chosen and a new edge point is located and stored, and the edge searching process continues. If a contrast peak is not located, and a Z extrapolation has not already been tried, then the Z height for the next edge point XY trial location is extrapolated, an source image acquired, and the edge point is again searched for in that source image. If a new edge point is still not found and if an image stack has not already been taken at the Z height of the previous edge point, then a new image stack is obtained taking the Z height of the last detected edge point as the center. If a new edge point is still not found, then a halving routine is invoked as will be described in more detail below with respect to FIG. 9.

Figure 9:
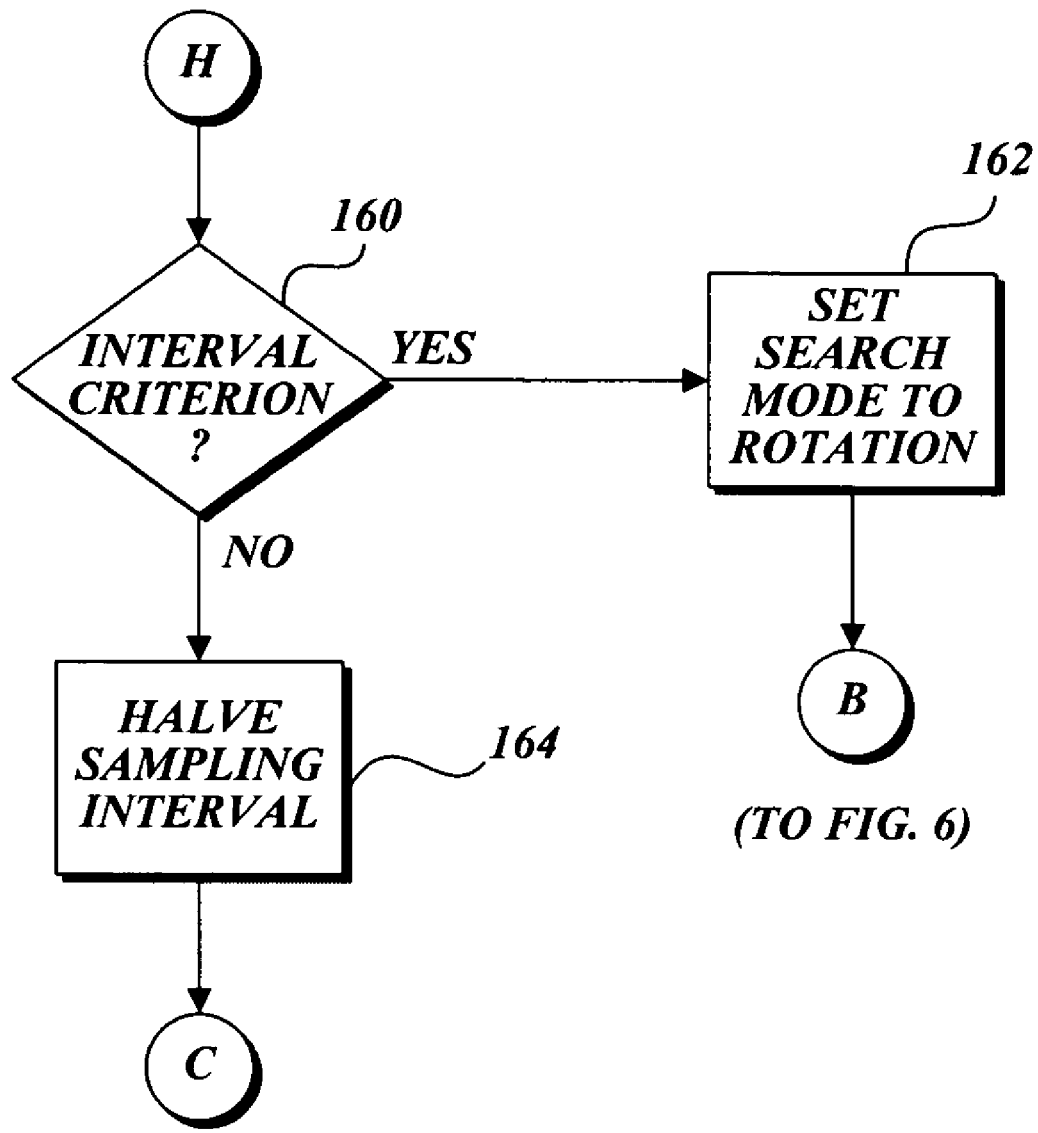
FIG. 9 is a flow diagram which is a part of the detailed autotrace method and which shows a routine in which the scan line sampling interval for the extrapolation is halved.

As shown in FIG. 7, the routine is continued from a point C, which may come from FIGS. 6, or 9. Initially, the routine utilizes a two-dimensional autotrace method in the plane of the image of the last determined edge point, to extrapolate the next edge point XY trial location, as described with reference to FIGS. 1A–1C. At a decision block 130, the routine determines whether an image stack is available for the next edge point XY trial location and has not yet been tried. If an image stack is not available for the next edge point XY trial location or the image stack has already been tried, then the routine proceeds to a decision block 138, which will be described in more detail below. If at decision block 130 the routine determines that an image stack is available for the next edge point XY trial location and has not yet been tried, then the routine proceeds to a block 132.

At block 132, the routine uses the image stack to find the maximum contrast value for the next edge point XY trial location. The process of using a peak contrast curve for the next edge point XY trial location has been previously described, and therefore is not described in detail here. It should be noted that this process of using the image stack establishes a best focus position, but does not require physical movement, and therefore saves a significant amount of processing time.

At a decision block 134, the routine determines whether a contrast peak has been found. If a contrast peak is found, then the routine proceeds to a block 136. At block 136, the routine runs a tool scan to get an edge point in the source image exhibiting the peak contrast. The routine then proceeds to a point F, which is continued in FIG. 8.

If at decision block 134 the routine determines that a maximum contrast value has not been found, then the routine proceeds to a decision block 138. At decision block 138, the routine determines whether a Z extrapolation has been tried. If a Z extrapolation has been tried, then the routine proceeds to a decision block 146, which will be described in more detail below. If at decision block 138 the routine determines that a Z extrapolation has not been tried, then the routine continues to a block 140. At block 140, the routine executes the Z extrapolation. In a preferred embodiment, the Z extrapolation may be executed by estimating the Z height for the next edge point XY trial location by extrapolating it using the Z heights and XY locations of the previous two edge points. That is, the extrapolated Z height is a linear extrapolation from the XYZ coordinates of the last two previously determined edge points, based on the anticipated XY location of the next edge point to be determined. A new image is acquired at the extrapolated Z-position and including the anticipated XY location for locating the next edge point trial location, and then the routine proceeds to a block 142.

At the block 142, the routine runs a tool scan to get an edge point. At a decision block 144, the routine determines whether an edge point has been found. If an edge point has been found, then the routine proceeds to a point G, which is continued in FIG. 8. If an edge point has not been found, then the routine proceeds to a decision block 146.

At decision block 146, the routine determines whether an image stack has already been taken that includes the present location and centered around the Z-height of the last detected edge point. In a preferred embodiment, the present location is the anticipated XY location of the next edge point trial location. If an image stack has already been taken that includes the present location and centered around the Z-height of the last detected edge point, then the routine proceeds to a point H, which is continued in FIG. 9. If the routine determines that an image stack has not already been taken at the present location and is centered around the Z-height of the last detected edge point, then the routine proceeds to a block 148. At block 148, the routine acquires a new stack of images using the Z height of the last detected edge point as the center. The routine then returns to decision block 130.

FIG. 8 is a flow diagram which includes routines for updating an edge point buffer and resetting a search mode. The routine is continued from a point F, which may come from FIGS. 7 or 10, or from a point G, which comes from FIG. 7. At a block 150, the routine updates the point buffer. The point buffer generally includes all determined coordinates for all determined edge points of the current edge tracing operation. At a block 152, the edge tracing search mode is reset. The routine then proceeds to a point A, which is continued in FIG. 6.

FIG. 9 is a flow diagram which includes a routine in which the scan line sampling interval for the extrapolation line is halved. In summary, in this routine the scan line sampling interval for extrapolation is initially halved. Then the edge tracing process is redirected to the beginning of FIG. 7. If it succeeds, the search process is redirected to the beginning of FIG. 7 and the extrapolation interval is reset to the predetermined value. Otherwise, this routine is repeated until the scan line sampling interval reaches a predetermined criterion. If the predetermined criterion is reached, then a rotation search is invoked as will be described in more detail below with respect to FIG. 10.

As shown in FIG. 9, the routine is continued from a point H, which comes from FIG. 7. At a decision block 160, the routine determines whether the scan line sampling interval has become so small that it has reached the interval criterion, that is, a minimum allowed distance between scan lines. If the interval criterion has been reached, then the routine proceeds to a block 162. At block 162, the search mode is set to the rotation mode, and the routine proceeds to a point B, which is continued in FIG. 6. If at block 160 the interval criterion has not been reached, then the routine proceeds to a block 164. At block 164 the scan line sampling interval for the extrapolation is halved. The routine then proceeds to a point C, which is continued in FIG. 7.

Figure 10:
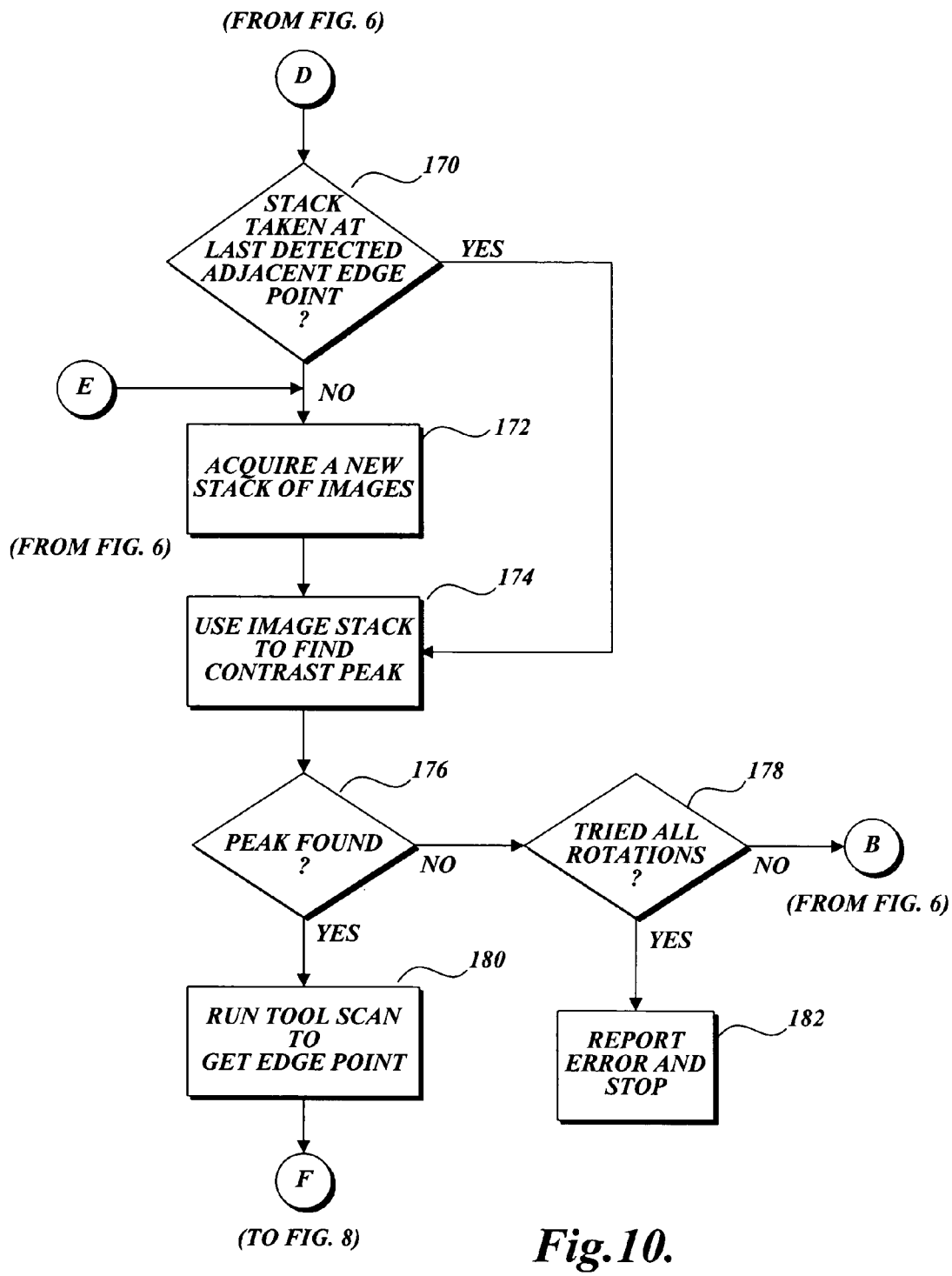
FIG. 10 is a flow diagram which is a part of the detailed autotrace method and which shows a routine in which a rotation mode is utilized.

FIG. 10 is a flow diagram which includes a routine in which a rotation mode is utilized. In summary, if there is not a stack of images taken at an adjacent detected edge point, the routine first acquires a new stack of images taking the Z height of the last detected point as the Z scanning center. Similar to the circular search of the 2D prior art method described above, the routine repeats the searching process on multiple edge point trial locations/directions, which are tangential to the circumference of a circle centered on the last detected edge point. The radius of the circle initially equals to the initial scan line sampling interval. In one embodiment of this routine, the Z extrapolation using the two previously detected edge points is not applied, since the rotation mode inherently indicates that a discontinuity in an edge has been encountered. Under such conditions, in the presence a discontinuity of unknown proportions, extrapolation may contribute to the detection of incorrect edge points.

As shown in FIG. 10, the routine is continued from a point D, which comes from FIG. 6. At a decision block 170, the routine determines whether an image stack has been already taken at the last detected adjacent edge point. It should be noted that the last detected adjacent edge point is the previously discussed "pivot" point for the current set of rotation operations. It is possible that the last detected adjacent edge point was based on a single source image acquired on the basis of an extrapolated Z position. Thus, in the presence of an unknown discontinuity, an image stack is acquired to support robust rotation edge detection operations. If an image stack has been taken at the last detected adjacent edge point, then the routine proceeds to a block 174, which will be described in more detail below. If at block 170 the routine determines that an image stack has not been taken at the last detected adjacent edge point, then the routine proceeds to a block 172.

At block 172, the routine acquires a new stack of images. Block 172 may also be reached from point E from FIG. 6. At block 174, the routine uses the image stack to find the maximum contrast value, as previously described. At a decision block 176, the routine determines whether the maximum contrast value has been found. If a maximum contrast value has not been found, then the routine continues to a decision block 178, which will be described in more detail below. If at decision block 176 a maximum contrast value has been found, then the routine proceeds to a block 180, where the tool scan is run in order to get the edge point. The routine then proceeds to a point F, which is continued in FIG. 8.

At decision block 178, the routine determines whether all the rotations, that is, the rotation increments, have been tried. If all the rotations have not been tried, then the routine proceeds to a point B, which is continued in FIG. 6. If at decision block 178 the routine determines that all the rotations have been tried, then the routine proceeds to a block 182, where an error is reported and the routine stops.

It should be appreciated that the methods disclosed in FIGS. 3–10 are advantageous in that they can accurately trace the three-dimensional edge contour of an object without the need for extraneous operations and particularly without the need for extraneous physical motion of the vision system. As illustrated in FIGS. 2A–2C, objects may have three-dimensional edge contours for a number of reasons, including improper alignment to the XY plane, irregularities in the Z-direction, and designs which are three dimensional in nature. The disclosed method advantageously uses a stack of stored images and/or extrapolated Z positions as the basis for source images for performing edge detecting operations, rather than attempting to use time-consuming autofocus operations. Thus, the systems and methods of this invention save a significant amount of motion and processing time in comparison to alternative methods. In addition, when the most precise Z measurement of edge points is not an objective of the method, for example when the coordinates of a relatively flat part are to be measured, but the part nevertheless extends more than one depth of field in the Z axis direction, estimating the maximum contrast Z position an edge point based on existing images significantly speeds up the process of edge detection and edge point position determination.

The various embodiments of the three-dimensional autotrace edge detection operations according to this invention save time when the vision system is operated in a "learning" mode, where it is being programmed to measure various characteristics of a relatively long edge contour, which has extended depth, and which might cross multiple video images. Furthermore, since these operations have the ability to determine or modify its trace path based upon the edge contour information of a particular sample at run time, it also helps to avoid the run-time failures that occur with edge tools which rely on a fixed position and a pre-programmed edge configuration.

It should be appreciated that all of the above-described method steps can be advantageously executed on a general purpose computer, and can also be advantageously instantiated as specialized hardware, such as a gate array, an application specific integrated circuit or as a custom integrated circuit chip. Also, the invention includes the method steps explained and claimed herein expressed as computer-readable instructions, and stored on a magnetic or optical storage media to provide an article of manufacture that embodies the invention.

It should also be appreciated that many alternative arrangements of the previously described blocks, operations and steps are possible, and will be apparent to one skilled in the art. Thus, while the preferred embodiment and various other embodiments of the invention have been illustrated and described, it will be appreciated that various changes can be made therein without departing from the spirit and scope of the invention.

The embodiments of the invention in which an exclusive property or privilege is claimed are defined as follows:

1. A method for operating a vision system, comprising:
   determining a set of coordinates for a plurality of edge points along an edge contour of an object,
   wherein the plurality of edge points extend over a depth range greater than the depth of field of an image of the edge contour, and
   wherein determining the set of coordinates comprises:
   (a) determining the XYZ coordinates for at least a latest previous edge point in at least a latest previous edge point source image;
   (b) automatically determining a next edge point XY trial location based at least partially on the XY location of the latest previous edge point;

(c) determining a next edge point source image that is focused at a different Z coordinate than the latest previous edge point source image, including at least one of:
  (i) evaluating a focus characterization in the vicinity of the next edge point XY trial location for a plurality of previously acquired images corresponding to a plurality of focus positions,
  (ii) estimating a Z coordinate of the next edge point in the vicinity of the next edge point XY trial location based on previously acquired data,
  (iii) estimating a focus position corresponding to a well focused image of the next edge point in the vicinity of the next edge point XY trial location based on previously acquired data, and
  (iv) acquiring a plurality of images that include the next edge point XY trial location and that correspond to a plurality of focus positions over a range that includes a focus position corresponding to the Z coordinate of the latest previous edge point; and
(d) searching for the next edge point in the next edge point source image.

2. The method of claim 1, wherein the step of determining a next edge point source image comprises selecting one of the plurality of previously acquired images that is determined to have the best focus in the vicinity of the next edge point XY trial location.

3. The method of claim 1, wherein the previously acquired data comprises the determined XYZ coordinates for the latest previous edge point and for a previous edge point before the latest previous edge point, and the step of determining a next edge point source images comprises:
  determining an estimate Z coordinate in the vicinity of the next edge point XY trial location; and
  acquiring the next edge point source image at a focus position based on corresponding to the estimate Z coordinate.

4. The method of claim 3, wherein the step of determining an estimated Z coordinate in the vicinity of the next edge point XY trial location comprises:
  determining a line through the determined XYZ coordinates for the latest previous edge point and the previous edge point before the latest previous edge point; and
  determining an extrapolated Z coordinate on the line in the vicinity of the next edge point XY trial location.

5. The method of claim 1, wherein the step of determining a next edge point source image comprises:
  evaluating a focus characterization in the vicinity of the next edge point XY trial location for a plurality of previously acquired images corresponding to a plurality of focus positions;
  fitting a curve to at least some of the determined focus characterizations as a function of the corresponding focus positions;
  determining a best focus position corresponding to a peak of the fitted curve; and
  acquiring the next edge point source image based on the determined best focus position.

6. The method of claim 5, wherein the focus characterization comprises a contrast value.

7. The method of claim 6, wherein the contrast value comprises a peak-gradient value determined along a scan line in the at least some of the plurality of images.

8. The method of claim 7, wherein the same scan line location is used in the step of searching for the next edge point in the next edge point source image.

9. The method of claim 8, wherein the same peak-gradient value is used in the step of searching for the next edge point in the next edge point source image.

10. The method of claim 1, wherein the step of determining a next edge point source image comprises:
  estimating a focus position corresponding to a well focused image of the next edge point in the vicinity of the next edge point XY trial location based on previously acquired data; and determining the next edge point source image based on the estimated focus position.

11. The method of claim 1, wherein the step of searching for the next edge point in the next edge point source image includes determining the XYZ coordinates of the next edge point and the method further comprises:
  the just-determined next edge point becomes the latest previous edge point;
  the next edge point image becomes the latest previous edge point image; and
  the method iteratively continues with the step of automatically determining a next edge point XY trial location.

12. The method of claim 1, wherein the step of searching for the next edge point in the next edge point source image comprises:
  performing at least one edge detection operation along a scan line spaced at a present scan line sample interval from the latest previously determined edge point and coinciding with the next edge point XY trial location in the next edge point source image.

13. The method of claim 11, wherein if the at least one edge detection operation along a scan line coinciding with the next edge point XY trial location fails to detect an edge point, a new scan line is defined spaced at one half of the present scan line sample interval from the latest previously determined edge point, and a new next edge point XY trial location is established coinciding with the new scan line, and the second determining step and the searching step are repeated.

14. The method of claim 13, wherein when the one half of the present scan line sample interval is less than a predetermined minimum scan line sample interval, the searching step further comprises:
  defining a new scan line sample interval larger than the present scan line sample interval; and
  performing edge detection operations along scan lines determined in multiple directions that are tangential to a circular pattern that is centered around the latest previously determined edge point and that has a radius equal to the new scan line sample interval, until an edge point is detected.

15. The method of claim 1, wherein the method is employed for operating a vision system during a learn mode of operation.

16. The method of claim 1, wherein the method is employed for operating a vision system during a run mode of operation.

* * * * *

UNITED STATES PATENT AND TRADEMARK OFFICE
CERTIFICATE OF CORRECTION

PATENT NO. : 7,120,286 B2 Page 1 of 1
APPLICATION NO. : 09/990238
DATED : October 10, 2006
INVENTOR(S) : D. Yu et al.

It is certified that error appears in the above-identified patent and that said Letters Patent is hereby corrected as shown below:

| COLUMN | LINE | |
|---|---|---|
| 15 (Claim 1, | 21 line 34) | the subclause beginning with "(d)" should be single-indented, not double-indented |
| 15 (Claim 3, | 32 line 5) | "images comprises:" should read --image comprises-- |
| 15 (Claim 3, | 33 line 9) | "estimate Z" should read --estimated Z-- |
| 15 (Claim 3, | 36 line 9) | after "position" delete "based on" |
| 15 (Claim 3, | 36 line 9) | "estimate Z" should read --estimated Z-- |
| 16 (Claim 10, | 12 line 6) | after "acquired data; and" insert a line break and begin a new subclause |
| 16 (Claim 13, | 34 line 1) | "claim 11," should read --claim 12,-- |

Signed and Sealed this

Twenty-fourth Day of July, 2007

JON W. DUDAS
*Director of the United States Patent and Trademark Office*